United States Patent Office 3,184,462
Patented May 18, 1965

3,184,462
CERTAIN 4-SUBSTITUTED QUINAZOLINES
Homer C. Scarborough, Yao Hua Wu, and Rolland F. Feldkamp, Evansville, Ind., assignors to Mead Johnson & Company, Evansville, Ind., a corporation of Indiana
No Drawing. Filed Mar. 10, 1961, Ser. No. 94,710
10 Claims. (Cl. 260—256.4)

This invention relates to new 4-substituted quinolines and quinazolines, and more particularly to compounds of the structure

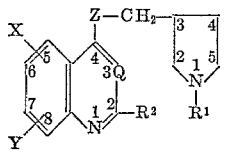

and

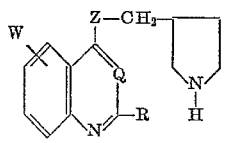

wherein X is hydrogen, halogen, methyl, or lower alkoxy, each containing up to about four carbon atoms; Y is hydrogen or halogen; Z is oxygen, imino, or methyl imino; Q is nitrogen, methylmethenyl, or methenyl; $R^1$ is lower alkyl, lower alkylene, hydroxy lower alkyl, each containing up to four carbon atoms, or it is a phenyl lower alkyl group containing up to ten carbon atoms; $R^2$ is hydrogen, hydroxy, methoxy, chlorine, mercapto, or methyl; W is hydrogen, methyl, or lower alkoxy, containing up to about four carbon atoms; R is hydrogen, hydroxy, methoxy, or methyl; and the acid addition salts of said compounds. It also relates to processes for preparing these substances and to valuable intermediates useful for this purpose. For a clear understanding of the following disclosure, the numbering system for the ring systems involved is indicated in the first of the above formulas. This patent application is a continuation-in-part of our copending application Serial No. 34,877, filed June 9, 1960, and now abandoned.

The compounds having the structure indicated above, have a variety of useful pharmacological properties. They have a generalized vasodilating action affecting a variety of beds, including the coronary bed and cutaneous beds. They are bronchodilators. They have marked anti-inflamatory activity which is thought to result at least in part from their ability to prevent the excessive capillary permeability often associated with inflammatory processes. They also possess steroidal anti-inflamatory action as demonstrated in the classical granuloma inhibition tests but they lack other actions of steroids, such as anabolic or endocrinologic effects. They have anti-amebic activity. These diverse properties are observed for all members of the series and are present in varying ratios with respect to each other for specific members of the series. The recommended daily dosage is from about 5 to 100 milligrams per kilogram of body weight taken at three or four intervals each day. The compounds may be administered orally in the form of capsules, tablets, elixirs, powders, or suspensions or they may be administered parenterally in solution or suspension in suitable vehicles. They may be administered by the intravenous route.

The compounds of this invention are prepared by a number of methods depending upon the ultimate product sought. Thus, for example, the 4-(1-substituted-3-pyrrolidylmethylamino)quinazolines are readily prepared by the reaction of a 4-chloroquinazoline with 1-substituted-3-pyrrolidylmethylamines preferably at room temperature in a suitable liquid vehicle. The following equation will illustrate the reaction:

Equation 1

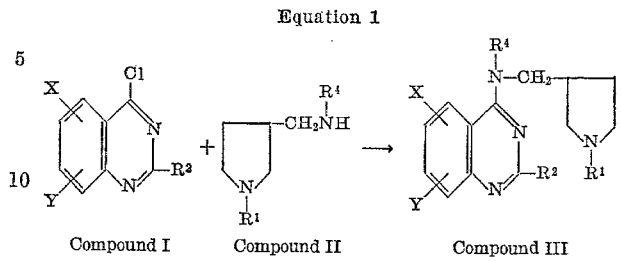

Compound I    Compound II    Compound III wherein X, Y, $R^1$, and $R^2$ are as above defined, and $R^4$ is selected from the group consisting of hydrogen and methyl.

Similarly the products of the present invention are prepared by the reaction of 4-mercaptoquinazolines and Compound II above, in which the aminomethyl group in the number 3 position of the pyrrolidyl ring is a primary amine (where $R^4$ is hydrogen). The equation for the reaction is as follows:

Equation 2

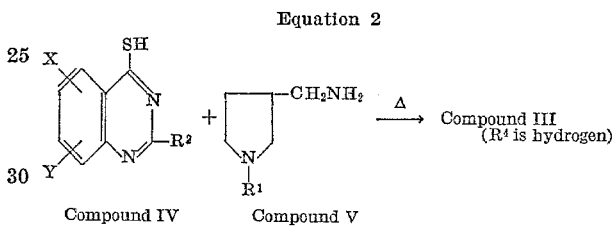

Compound IV    Compound V wherein X, Y, $R^1$ and $R^2$ are as previously defined. This method is preferred when $R^2$ is methyl since 2-methyl-4-mercaptoquinazoline, the required starting material, is readily obtained as indicated hereinafter. This process is conducted either with or without a solvent or liquid diluent at temperatures from about 100° to 200° C. Hydrogen sulfide is evolved and may serve as a useful gauge of the progress of the reaction.

The 4-(1-substituted-3-pyrrolidylmethoxy)quinazolines are prepared by the reaction of 4-chloroquinazolines and an alkali metal (such as sodium, potassium or lithium) 1-substituted-3-pyrrolidylmethoxide in accordance with the following reaction:

Equation 3

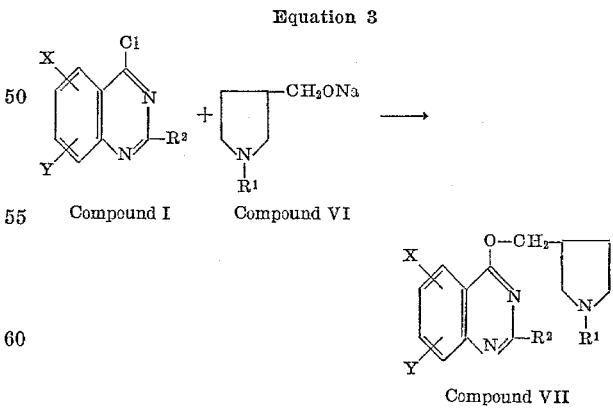

Compound I    Compound VI

Compound VII

The foregoing method of Equation 3 is most conveniently carried out in an inert liquid vehicle such as a liquid hydrocarbon or ether and the reaction mass may be heated to accelerate the process. The reaction is carried out under substantially anhydrous conditions to avoid destruction of the alkali metal pyrrolidylmethoxide. Refluxing in an inert solvent such as toluene is one convenient procedure although the reaction proceeds satisfactorily even at ordinary temperatures.

The 4-(1-substituted-3-pyrrolidylmethylamino) quinolines are prepared by the reaction of Compound II with a 4-chloroquinoline in the presence of a phenol and a mineral acid such as hydrochloric acid as is illustrated in the following equation:

Equation 4

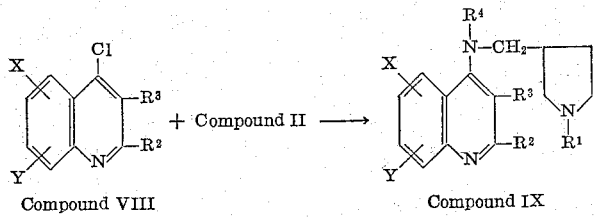

Compound VIII    Compound IX wherein R³ is hydrogen or methyl.

Compound IX is also prepared by the reaction of a 4-phenoxyquinoline with Compound II in the presence of a mineral acid as follows:

Equation 5

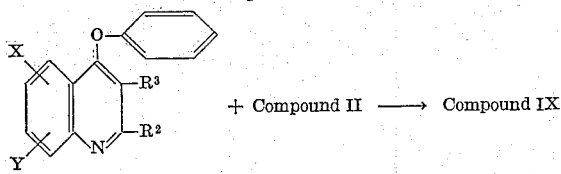 + Compound II ⟶ Compound IX wherein the groups $R^2$, $R^3$, X and Y are as defined above.

Similarly the reaction of a 4-chloroquinoline and Compound VI results in the corresponding 4-(1-substituted-3-pyrrolidylmethoxy)quinoline of the structure:

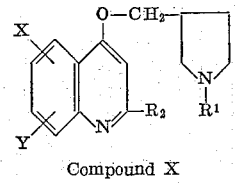

Compound X wherein X, Y, $R^1$, and $R^2$ are as defined above.

In the foregoing discussion it should be understood that the group "X" is preferably in the number 5 or 6 position and the group "Y" is preferably in the number 7 or 8 position of the quinoline or quinazoline structures.

The starting materials utilized in these processes are readily obtained. The 1-substituted-3-pyrrolidylmethylamine may be prepared by the method disclosed in the copending United States patent application of Wu, Feldkamp and Scarborough, Serial No. 34,878, filed June 9, 1960, now U.S. Patent No. 3,133,082. The 1-substituted-3-pyrrolidylmethyl alcohols are disclosed in United States Patent No. 2,826,588 dated March 11, 1958, to Feldkamp and Wu.

The 4-chloroquinazolines are prepared by the following method:

*4-chloroquinazoline.*—A mixture of 15 g. (0.103 mole) of 4-quinazolone prepared by the method of Endicott et al., J.A.C.S. 68, 1299 (1946), 180 ml. of phosphorus oxychloride and 37 ml. of triethylamine is refluxed for two and one-half hours and then concentrated to a dark oily residue at reduced pressure. The residue is extracted three times with a total of 800 ml. of hot n-heptane containing 5% triethylamine. The combined extracts which contain a brown flocculent material are washed once with 14% ammonium hydroxide and twice with water. The wet n-heptane is concentrated on the hot plate to approximately 300 ml. A yellow amorphous solid is removed with activated charcoal and the solution chilled at −20° C. to furnish 9.1 g. of product, M.P. 96–97° C. Concentration of the liquor yields 0.8 g. of a second crop, M.P. 94.5–96° C. The yield is 59%.

Another modification of this procedure is as follows: To 20 g. of 4-quinazolone contained in a 500-ml. round bottom flask equipped with a reflux condenser and drying tube is added 240 ml. of phosphorus oxychloride and 50 g. of triethylamine. After refluxing for two and one-half hours the dark mixture is concentrated to one-fourth volume under reduced pressure and added cautiously to a large excess of cracked ice and 28% ammonium hydroxide. The resulting suspension is filtered and the filtrate discarded. The filter cake is dried in vacuo at 60° and then extracted with 500 ml. of hot n-heptane. The insoluble brown material is discarded and the filtrate concentrated to approximately 200 ml. and chilled at −20° to yield 13.7 g., M.P. 94–96°. Concentration of the liquor yields 1.6 g. of an identical second crop for a total yield of 68%.

The products having the formula of Compound XI which appears below in which the pyrrolidino nitrogen atom is unsubstituted are preferably prepared by a new and facile synthesis employing the 1-(disubstituted amino)-3-pyrrolidylmethylamine or methanol intermediates illustrated by Compound XII:

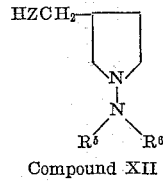

Compound XII in which Z is an imino or methylimino group or an oxygen atom as previously indicated, and $R^5$ and $R^6$ are aliphatic hydrocarbon groups having up to about four carbon atoms and include methyl, ethyl, propyl, butyl, methallyl, butenyl, allyl, and propenyl groups.

Compound XII intermediates are reacted according to the methods hereinbefore described and outlined in Equations 1, 2, 3, 4, and 5 with intermediates having the formula of Compounds I, IV, VII, etc. to produce further intermediate Compound XIII. The latter on catalytic hydrogenolysis according to Equation 6 yields Compound XI, the desired product having pharmacological properties and uses previously defined. Hydrogenolysis is preferably accomplished over a Raney nickel catalyst at atmospheric pressure or slightly above (1 to 5 atmospheres) with the substrate dissolved or suspended in a hydrogenation inert solvent, such as ethanol, ether, dioxane or other lower alkanol ether or cyclic ether.

Equation 6

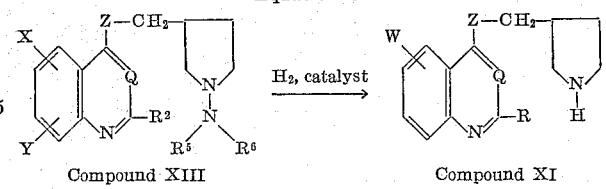

Compound XIII    Compound XI

The symbols W, X, Y, Z, R, $R^2$, $R^5$ and $R^6$ used in Equation 6 have the same meaning as has already been stated herein.

The catalytic hydrogenolysis conditions result in removal of certain of the X, Y, and $R^2$ substituents. For instance, if any of these groups is a halogen atom, it is lost in the course of this process step. When $R^2$ is a mercapto group, it is similarly replaced by hydrogen. It is preferred that $R^2$ be other than mercapto in application of this process to the synthesis of Compound XI, since sulfur-containing compounds sometimes act as catalyst poisons and prevent the hydrogenolysis from taking place in efficient fashion. If the hydrocarbon groups $R^5$ and $R^6$ are unsaturated, hydrogenation of these unsaturations may also occur.

For the preparation of those products of Compound XI in which Z is an oxygen atom, intermediates having the structure of Compound XIV are needed.

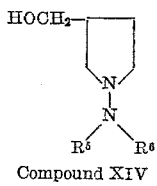

Compound XIV

Compound XIV is a 1-(disubstituted amino)-3-pyrrolidyl methanol. The same conditions apply to condensation of the alkali metal salts thereof with Compound I or Compound VIII as in corresponding processes employing Compound VI, the alkali metal 1-alkyl-3-pyrrolidylmethoxides.

For the preparation of Compound XI in which Z is an imino or methylimino group intermediates having the structure of Compound XV are employed.

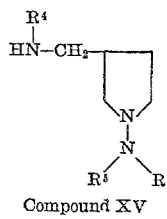

Compound XV

Compound XV is a 1-(disubstituted amino)-3-pyrrolidylmethylamine. $R^5$ and $R^6$ have the same meaning as previously indicated, and $R^4$ is a hydrogen atom or methyl group. The same conditions apply in use of Compound XV as an intermediate in the process of Equation 6 as in the processes of Equations 1, 2, and 4.

The benzyl group may also be used as a blocking group for the pyrrolidino nitrogen atom in the preparation of products of Compound XI rather than disubstituted amino group as has been described. That is, 1-benzyl-3-pyrrolidylmethanol and 1-benzyl-3-pyrrolidylmethylamine and its N-methyl derivative may be used in the above syntheses, coupled with hydrogenolysis of the pyrrolidino-1-benzyl group. This has been found to be a considerably less efficient and less convenient procedure, however, and our novel method employing a disubstituted amino blocking group is considered superior.

Compound XII is prepared by reaction of an unsymmetrical disubstituted hydrazine with an itaconic acid diester, such as dimethylitaconate or other lower dialkylitaconate, to provide a 1-disubstituted amino-3-carboalkoxy-5-pyrrolidinone (Compound XVI). Reaction of this substance with ammonia or monomethylamine provides the corresponding 5-pyrrolidinone-3-carboxamide, which, on reduction with lithium aluminum hydride yields Compound XV. This is illustrated in Equation 7.

Equation 7

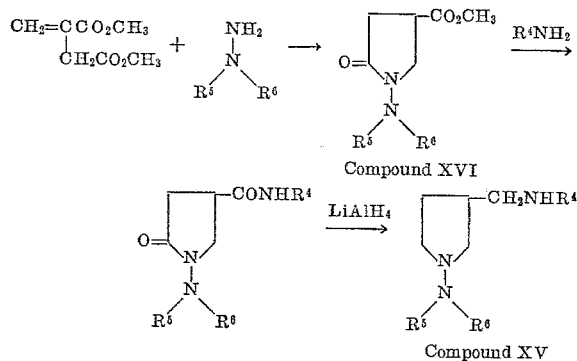

In reaction of Compound XV with Compound I according to Equation 6, when Compound I is a quinazoline, it is preferred to employ a quinazoline bearing a halogen substituent in the benzenoid ring, that is, in which either X or Y is a halogen atom. This appears to enhance the reactivity of the chlorine atom in the 4-position resulting in a better yield of the substitution product, Compound XIII. The halogen atom in the benzenoid ring is then lost in the hydrogenolysis step.

The 1-(disubstituted amino)-3-pyrrolidylmethanol intermediates having the formula of Compound XIV are prepared in a manner closely related to that used for the preparation of Compound XV. Compound XVI, the 1-(disubstituted amino)-3-carbomethoxy - 5 - pyrrolidinone intermediate of Equation 7, is reduced with lithium aluminum hydride directly, rather than after reaction with ammonia or methylamine, to yield the desired 1-(disubstituted amino)-3-pyrrolidylmethanol, Compound XIV. This is illustrated in Equation 8. Again, as in Equations 7 and 9, $R^5$ and $R^6$ are saturated or unsaturated aliphatic hydrocarbon groups containing up to about four carbon atoms, and preferably primary lower alkyl groups, such as methyl, ethyl, n-propyl, n-butyl, etc.

Equation 8

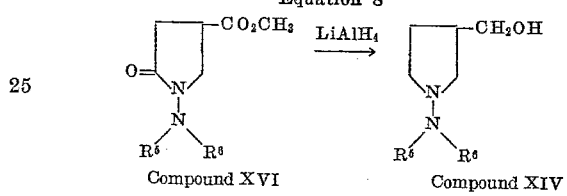

Compound XVI          Compound XIV

A particularly preferred group of compounds of the present invention are the quinazolines having the formulas of Compounds XVII and XVIII in which the symbols W, X, Y, and $R^1$ have the same meanings as previously specified.

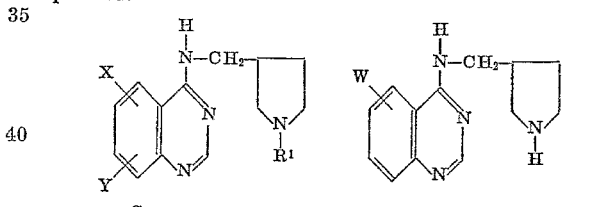

Compound XVII          Compound XVIII

These compounds are preferred since their anti-inflammatory properties are particularly pronounced and they have high therapeutic ratios. They also are valuable as bronchodilators.

Having now described our invention, we provide the following specific examples to illustrate various embodiments thereof. These examples are not, however, to be considered as limiting the scope of our invention which is set forth in the appended claims. All temperatures are expressed as degrees centigrade.

EXAMPLE I

*4-(1-methyl-3-pyrrolidylmethylamino)quinazoline*

A. *From 4-chloroquinazoline.*—To a solution of 8 g. (0.049 mole) of 4-chloroquinazoline in 200 ml. of anhydrous ether is added, in one portion, 11.1 g. (0.097 mole) of 1-methyl-3-pyrrolidylmethylamine as a solution in 60 ml. of anhydrous ether. The resulting solution becomes cloudy immediately with precipitated hydrochloride salt. After standing at room temperature for twenty-four hours, the ether is removed on the steam bath and the residue dissolved in 150 ml. of water. The water solution is made alkaline (pH 12-13) with 20% sodium hydroxide and the oily mixture extracted three times with chloroform. The combined chloroform extracts are washed once with water, once with saturated sodium chloride solution and then dried over magnesium sulfate. After removing the chloroform the residual oil is dissolved in 50 ml. of hot acetonitrile, the solution treated with Norite brand activated charcoal, cooled, and seeded to yield 7.1 g., 61%, M.P. 109.5–111°.

B. *From 4-mercaptoquinazoline.*—4-mercaptoquinazoline, 23.1 g. (0.143 mole) prepared as disclosed in Leonard and Curtin, J. Org. Chem. 11, 349 (1946), and 1-methyl-3-pyrrolidylmethylamine, 24.4 g. (0.214 mole), are placed in a 100-ml. round bottom flask equipped with a reflux condenser and the mixture heated in an oil bath at 110–115° for thirty minutes longer than the time required to effect solution. Hydrogen sulfide is evolved during the heating period. The reaction mixture is cooled slightly and enough chloroform added to make the mixture fluid. The mixture is placed in a separatory funnel and washed once with ice cold 10% sodium hydroxide and then with water. After drying over magnesium sulfate, the chloroform is removed in vacuo and the residual oil diluted slightly with butanone and chilled to give a solid mass. Seed crystals are removed and the material (treated with activated charcoal) recrystallized twice from acetonitrile to yield 22.7 g. (66%), M.P. 111–112°.

EXAMPLES II–VI

The 4-(3-pyrrolidylmethylamino)quinazolines of Examples II through VI set forth in Table I below are prepared by the method described above in Example I–B. A nitrogen atmosphere is generally employed with heating periods of about two and one-half hours. The temperature is raised to 140° as required in order to obtain a more homogeneous mixture at the start.

In the case of 4-(1-benzyl-3-pyrrolidylmethylamino)quinazoline, excess 1-benzyl-3-pyrrolidylmethylamine is removed by distillation in vacuo at the end of the reaction period. 2-methyl-4-mercaptoquinazoline (Tomisek et al., J.A.C.S. 70, 2423 (1948)), and 2-methyl-6-chloro-4-mercaptoquinazoline (ibid.) are prepared from 2-methyl-4-quinazolone (ibid.), (Meyer et al., J. Org. Chem. 8, 239 (1943)), and 2-methyl-6-chloro-4-quinazolone (Tomisek op. cit.) by reaction with phosphorous pentasulfide. In the same manner, 6-chloro-4-mercaptoquinazoline, M.P. 327–330° (dec.), is prepared in 79% yield by reaction of 6-chloro-4-quinazolone (Endicott et al., J.A.C.S. 68, 1303 (1946)) with phosphorous pentasulfide in refluxing xylene.

which a large amount of the hydrochloride salt of the product precipitates. After removal of the ether on the steam bath the residue is dissolved in approximately 150 ml. of distilled water. The solution is made basic (pH 11–12) with 20% sodium hydroxide and then extracted three times with 100-ml. portions of chloroform. The combined chloroform extracts are washed with water, with saturated sodium chloride solution, and then dried over magnesium sulfate. The residue remaining after removal of chloroform is distilled twice to furnish 11.3 g. or 73% of a light green viscous liquid, B.P. 170–180° at 25 micros/Hg, $n_D^{24}$ 1.6078.

EXAMPLE VIII

*4-(1-methyl-3-pyrrolidylmethoxy)quinazoline hydrochloride*

To a suspension of 3.82 g. of 51.5% sodium hydride emulsion (0.082 mole NaH) in 90 ml. of dry toluene contained in a 250-ml. three-necked flask equipped with reflux condenser, drying tube, stirrer, and dropping funnel is added dropwise a solution of 9.45 g. (0.082 mole) of 1-methyl-3-pyrrolidylmethanol in 60 ml. of dry toluene. After addition is complete, the solution is refluxed for one-half hour and then cooled to room temperature. 4-chloroquinazoline, 11.8 g. (0.072 mole), is added all at once and the solution refluxed with stirring for four hours. Sodium chloride precipitates after fifteen minutes. The mixture is then cooled to room temperature, washed with two 50-ml. portions of water and dried over magnesium sulfate. The toluene is removed at reduced pressure and the residual oil dissolved in 30 ml. of absolute ethanol. The addition of one equivalent of ethanolic hydrogen chloride and chilling yields 17 g. (85% of a crystalline hydrochloride, M.P. 172–177°. The crude product is dissolved in hot n-propanol and butanone added until the solution becomes turbid. The crystalline product obtained upon cooling is recrystallized twice from a mixture of methanol and n-propanol to furnish 6.9 g., M.P. 192–194° (35%).

TABLE I.—4-(1-SUBSTITUTED-3-PYRROLIDYLMETHYLAMINO)QUINAZOLINES

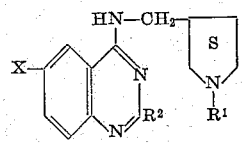

| Example | X | R² | R¹ | M.P., °C. | Yield percent [1] |
|---|---|---|---|---|---|
| II | 4-(1-benzyl-3-pyrrolidyl-methylamino) quinazoline. | H | H | $C_6H_5CH_2$— | 105–107 a,b | 34 |
| III | 4-(1-β-hydroxy-ethyl-3-pyrrolidylmethylamino) quinazoline. | H | H | —$CH_2CH_2OH$ | 139–141 a,b,c | 38 |
| IV | 4-(1-methyl-3-pyrrolidyl-methylamino)-6-chloro-quinazoline. | Cl | H | $CH_3$— | 145–147 a,b,d | 59 |
| V | 2-methyl-4-(1-methyl-3-pyrrolidylmethylamino) quinazoline. | H | $CH_3$— | $CH_3$— | 123.5–125 a,b,d | 66 |
| VI | 2-methyl-4-(1-methyl-3-pyrrolidylmethylamino) 6-chloro-quinazoline. | Cl | $CH_3$— | $CH_3$— | 125–127 b | 45 |

[1] Yields are of analytically pure material.
Recrystallized from: a, butanone; b, acetonitrile; c, cyclohexane; d, isopropylacetate.

EXAMPLE VII

*4-[(1-methyl-3-pyrrolidylmethyl)methylamino] quinazoline*

To a solution of 9.9 g. (0.06 mole) of 4-chloroquinazoline in 200 ml. of anhydrous ether is added 15.4 g. (0.12 mole) of 1-methyl-3-pyrrolidylmethylmethylamine as a solution in 100 ml. of anhydrous ether. In several minutes the solution becomes cloudy. The turbid solution is allowed to stand at room temperature for two days during

EXAMPLES IX–X

The 4-(1-substituted-3-pyrrolidylmethoxy)quinazolines of Examples IX through X appearing below are prepared by the procedure of Example VIII.

EXAMPLE IX

*4-(1-isopropyl-3-pyrrolidylmethoxy)quinazoline hydrochloride*

This compound is prepared by the procedure of Example VIII however carrying out the recrystallization in ethanol-ethyl acetate to produce 60% yield of product melting at 183–183.5° C.

EXAMPLE X

4-(1-phenethyl-3-pyrrolidylmethoxy)quinazoline hydrochloride

This compound is prepared by the procedure of Example VIII however carrying out the recrystallization in isopropanol ethyl acetate solution to produce a 44% yield of product melting at 171–172° C.

EXAMPLE XI

4-[(1-methyl-3-pyrrolidylmethyl)methylamino]-7-chloroquinoline dihydrochloride To 20 g. (0.068 mole) of 4-phenoxy-7-chloroquinoline hydrochloride [Surrey et al., J.A.C.S. 73, 2623 (1951) (see Ex. XVI–XIX post)], contained in a 100-ml. three-neck round-bottom flask fitted with stirrer, thermometer, reflux condenser, and gas inlet tube is added 13 g. (0.102 mole) of 1-methyl-3-pyrrolidylmethylmethylamine. The stirred mixture is then heated at an internal temperature of 140–145° under prepurified nitrogen for twenty-four hours. The resulting mixture is then cooled slightly and sufficient methanol added to furnish a mobile fluid. The fluid is transferred to a separatory funnel, diluted with about 200 ml. of water and made alkaline (pH 12–13) with 15% sodium hydroxide. The mixture is then extracted with three 100-ml. portions of chloroform, the chloroform extracts combined, dried, and concentrated to furnish 16.6 g. (85%) of a light yellow oil. The material is twice distilled, B.P. 190° at 25 microns/Hg, to furnish 7.4 g. of a bright green oil.

The dihydrochloride is prepared by the addition of an excess of alcoholic hydrogen chloride to a solution of the oily base in absolute ethanol. Dilution of this solution with butanone furnishes a gum which is triturated with butanone with cooling in a Dry Ice-isopropanol bath to furnish a crystalline nonhydroscopic hydrochloride. It is helpful to use seed in recrystallizations from isopropanol and from ethanol-butanone. There is obtained 3.5 g., M.P. 172–174°.

EXAMPLE XII

7-chloro-4-(1-methyl-3-pyrrolidylmethoxy)quinoline

To a suspension of 2.8 g. (0.06 mole) of 51.5% sodium hydride emulsion in 60 ml. of dry toluene is added dropwise with stirring a solution of 6.9 g. (0.06 mole) of 1-methyl-3-pyrrolidylmethanol in 40 ml. of dry toluene. After addition is complete the mixture is warmed with stirring for an additional one-half hour and then 9.9 g. (0.05 mole) of 4,7-dichloroquinoline (Sterling-Winthrop Co.) is added. The stirred mixture is heated to yield a clear orange solution which is refluxed for 6 hours. A solid begins to separate after fifteen minutes. After standing overnight the cooled mixture is extracted with three 60-ml. portions of dilute hydrochloric acid. The combined acid extracts are washed with ether, made alkaline with sodium hydroxide solution and the separated oil taken up in ether. The ethereal solution is washed with water, dried and concentrated to an oil which solidifies. Recrystallization from isopropyl ether furnishes 11 g. (80%) of purified product, M.P. 70–73°. Material purified by recrystallization from isopropyl ether melts at 73.6°.

EXAMPLE XIII

4-(1-isopropyl-3-pyrrolidylmethoxy)-7-chloroquinoline dihydrochloride

To a stirring mixture of 5.94 g. (0.130 mole NaH) of sodium hydride emulsion and 200 ml. of dry toluene, protected from moisture, is added a solution of 19.1 g. (0.133 mole) of 1-isopropyl-3-pyrrolidylmethanol in 40 ml. of dry toluene (ten minutes). The mixture is stirred at reflux for two and one-half hours and then 24.9 g. (0.12 mole) of 4,7-dichloroquinoline is added. After stirring at reflux for forty-five hours, the reaction mixture is cooled, diluted with 200 ml. of ether, washed twice with 200 ml. of water and finally extracted twice with 150-ml. portions of 10% acetic acid and once with 200 ml. of 5% acetic acid. The combined acetic acid extracts are washed once with 400 ml. of 1:1 ether-hexane mixture and then made alkaline with 200 ml. of 20% sodium hydroxide. This oily mixture is extracted twice with 250-ml. portions of 3:2 ether-hexane and the combined organic liquors washed four times with water and then with brine. After drying over magnesium sulfate, the solvent is stripped to leave 30.5 g. of a red oil. The oil is dissolved in 100 ml. of absolute ethanol and 0.22 mole of ethanolic hydrogen chloride added. Cooling, followed by suction filtration, yields 34.0 g. (75%) of the dihydrochloride as a salmon-colored solid, M.P. 185–187°. After three recrystallizations from absolute ethanol ethyl acetate, there is obtained 26.0 g. (57%) of the salmon-colored dihydrochloride, M.P. 186.5–187°.

The 1-isopropyl-3-pyrrolidylmethanol, B.P. 109–112° at 13 mm., $n_D^{24}$ 1.4723, is prepared in 80% yield by lithium aluminum hydride reduction of 1-isopropyl-4-carbomethoxy-2-pyrrolidinone.

EXAMPLE XIV

4-[1-(2-phenylethyl)-3-pyrrolidylmethoxy]-7-chloroquinoline dihydrochloride

A procedure similar to that of Example XIII except that the reaction is carried out in a mixture of refluxing 3:1 xylene-toluene for three hours, using 1-(2-phenylethyl)-3-pyrrolidylmethanol as the amino alcohol is employed. From the crude free base was obtained 20.1 g. (82%) of the dihydrochloride, which after two recrystallizations from a mixture of absolute ethanol-isopropanol weighed 16.5 g. (67%), M.P. 168.5–169.5°.

From 16.2 g. of the dihydrochloride there is obtained 12.2 g. of the crude free base as a yellow oil, by regeneration with alkali. The oil is crystallized from n-heptane and then from di-isopropyl ether to furnish 8.5 g. (41%) of an off-white solid, M.P. 72.5–74°.

The 1-(2-phenylethyl-3-pyrrolidylmethanol, B.P. 108–115° at 5–15 microns/Hg, $n_D^{24}$ 1.5389, is prepared is prepared in 90% yield by lithium aluminum hydride reduction of 1-(2-phenylethyl)-4-carbomethoxy-2-pyrrolidinone.

EXAMPLE XV

7-chloro-4-(1-methyl-3-pyrrolidylmethylamino)quinoline

To 1 equivalent of chilled ethanolic hydrogen chloride is added a solution of 11.4 g. (0.1 mole) of 1-methyl-3-pyrrolidylmethylamine in 70 ml. of acetone. Phenol, 18.8 g. (0.2 mole), is added and the ethanol-acetone removed in vacuo, after which 19.8 g. (0.1 mole) of 4,7-dichloroquinoline and an additional 4.5 g. (0.04 mole) of the above amine are added. The flask containing the stirred mixture is heated at 125° for 10 hours at 140° for an additional two hours. After standing overnight the mixture is dissolved in 100 ml. of hot methanol. This solution is diluted with water until turbid and then 40% sodium hydroxide is added to adjust to pH 14. The mixture is extracted with ether, the ether extract washed with alkali, dried and concentrated to an oil which is recrystallized from acetone:isopropylether, yield 58%. The purified product melts at 106–108° C.

The dihydrochloride is prepared by the addition of excess hydrogen chloride to a solution of the base in n-propanol. The addition of ether causes an oil to precipitate which is crystallized from n-propanol-methanol and recrystallized from n-propanol-methanol, M.P. 255–260° (dec.).

EXAMPLE XVI TO XIX

7-chloro-4-phenoxyquinoline hydrochloride

The intermediate disclosed by Surrey et al., J. Amer. Chem. Soc. 73, 2623 (1951), is prepared as follows: A mixture of one mole of 4,7-dichloroquinoline and 2.5 moles of phenol is heated at 125° C. for eight hours in a three-necked, round bottomed flask equipped with an air condenser, thermometer and stirrer. The mixture is then cooled, dissolved in isopropanol and anhydrous ether is added to produce a white solid which, when recrystallized from n-propanol (75% yield), melts at 204–206° C.

The compounds in Table II following are prepared by heating 7-chloro-4-phenoxyquinoline with the appropriate 1-substituted - 3-pyrrolidylmethylamine for twenty-four hours at about 125° C. The reaction mixture is worked up in the manner of Example XV with the appropriate modification of the recrystallization step (see Table II). The yields given in the table are of the pure recrystallized material.

TABLE II.—7-CHLORO-4-(1-SUBSTITUTED-3-PYRROLIDYL-METHYLAMINO)QUINOLINES
[Examples XVI–XIX]

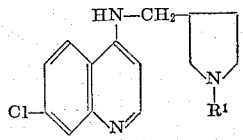

| Example | R¹ | M.P., ° C. | Yield, percent |
|---|---|---|---|
| XVI | CH₃CH₂— | 99–100 | 29 a, b. |
| XVII | CH₃CH=CH— | 126–128 | 50 a. |
| XVIII | CH₃(CH₂)₃— | 104–106 | 22 a. |
| XIX | Ph—CH₂— | 127–128 | 51 c, d. |

Recrystallized from: a, acetone; b, acetonitrile; c, butanone; d, isopropyl acetate.

EXAMPLE XX

*4-(1-methyl-3-pyrrolidylmethoxy)quinoline dihydrochloride*

A solution of 8.3 g. (0.03 mole) of 4-(1-methyl-3-pyrrolidylmethoxy)-7-chloroquinoline (Example XII) in 175 ml. of ethanol containing 0.03 mole of hydrogen chloride is reduced with 10% palladium on carbon in the Parr hydrogenation apparatus. Hydrogen uptake is stopped when the calculated pressure drop has occurred, the catalyst being once replenished. The catalyst is separated and the solution concentrated to a solid residue which is recrystallized two times from absolute ethanol to furnish 9 g. of product, 95%, M.P. 205–206°.

EXAMPLE XXI

*6-methoxy-4-(1-methyl-3-pyrrolidylmethylamino) quinoline*

Into a 100 ml. 3-necked flask equipped with gas inlet tube, thermometer, stirrer and condenser are placed 13.7 g. (0.048 mole) of 4-phenoxy-6-methoxyquinoline hydrochloride and 8.8 g. (0.072 mole) of 1-methyl-3-pyrrolidylmethylamine. The 6-methoxy-4-phenoxyquinoline hydrochloride is previously prepared by the reaction of 6-methoxy-4-chloroquinoline with phenol (British Patent No. 773,753 and Price et al., J. Amer. Chem. Soc., 60, 1204 (1946)), and recrystallized from isopropanol, hydrochloride, M.P. 204–205° (dec.); free base M.P. 89–92° (M. V. Rubstov, M. W. Lizgunova and E. D. Sazonova, J. Gen. Chem. (USSR), 16, 1873 (1946)).

The reaction mixture is stirred with heating at 125° (internal temperature) under a nitrogen atmosphere for twenty-four hours. The solution is cooled somewhat and diluted with methanol to maintain fluidity, transferred to a separatory funnel and diluted with 250 ml. of water. The mixture is made alkaline (pH 10–11) with 20% aqueous sodium hydroxide solution and then extracted with two 150-ml. portions of chloroform. The combined chloroform extracts are dried and concentrated in vacuo to an oily residue. The oil solidifies after being diluted with a small proportion of butanone and chilled at −20°. Seed crystals are preserved and the product recrystallized once from acetonitrile and twice from butanoneacetonitrile (1:1), to furnish 6.5 g. (34%) of purified material, M.P. 120–121°.

EXAMPLE XXII

*6-methoxy-4-(1-ethyl-3-pyrrolidylmethylamino) quinoline*

The reaction of 15 g. (0.052 mole) of 6-methoxy-4-phenoxyquinoline hydrochloride with 10 g. (0.079 mole) of 1-ethyl-3-pyrrolidylmethylamine as above furnishes 6.1 g. (27%) of purified product after recrystallization from acetonitrile M.P. 102–103°.

EXAMPLE XXIII

*6-methoxy-4-(1-methyl-3-pyrrolidylmethoxy) quinoline dihydrochloride*

To a suspension of 2.8 g. of 51.5% sodium hydride emulsion (0.06 mole) in 60 ml. of dry toluene contained in a 250-ml. 3-necked flask equipped with stirrer, reflux condenser and dropping funnel is added dropwise a solution of 6.9 g. (0.06 mole) of 1-methyl-3-pyrrolidylmethanol in 40 ml. of dry toluene. After addition is complete the mixture is refluxed for one-half hour yielding a clear orange solution to which 9.65 g. (0.05 mole) of 6-methoxy-4-chloroquinoline is added all at once. The solution is stirred under reflux for 48 hours, chilled and the precipitated sodium chloride collected on a Buchner funnel. The calculated quantity is obtained. The toluene solution is then extracted with three 60-ml. portions of 5 N hydrochloric acid; the acid extracts are combined and washed with ether. Basification of the acid solution to pH 10–11 with 20% sodium hydroxide yields an oil which is taken up in ether. The ether solution is washed with water, dried and concentrated to an oil which was dissolved in 20 ml. of absolute ethanol. The addition of 0.048 mole of alcoholic hydrogen chloride produced a microcrystalline solid which is separated. Since only a small amount of hydrochloride is formed the filtrate is treated with ethanolic hydrogen chloride until no further precipitation occurs. The crops are combined and recrystallized three times from absolute ethanol, sufficient methanol being added to the hot ethereal suspension of the hydrochloride to effect solution thereof. The yield of pure product, M.P. 231–232°, is 616 g., 39%.

EXAMPLE XXIV

*7-chloro-3-methyl-4-(1-methyl-3-pyrrolidylmethylamino)quinoline*

To a solution of 4.9 g. (0.043 mole) of 1-methyl-3-pyrrolidylmethylamine in 50 ml. of absolute methanol contained in a 3-neck 100-ml. round bottom flask is added one equivalent of ethanolic hydrogen chloride. After removal of the solvent at reduced pressure the flask is fitted with a mechanical stirrer, reflux condenser, thermometer and gas inlet tube.

Molten phenol, 27.8 g., then 2.4 g. (0.021 mole) of 1-methyl-3-pyrrolidylmethylamine and finally 9.1 g. (0.043 mole) of 3-methyl-4,7-dichloroquinoline (Steck et al., J. Amer. Chem. Soc., 68, 129, 380 (1946)), is added. The mass is heated at 125° under nitrogen for twenty-four hours. The flask is cooled somewhat and the dark red oil diluted with sufficient methanol to furnish a fluid mixture. The solution is diluted with 150 ml. of water and then adjusted to pH 12 with 20% sodium hydroxide. The mixture is extracted with three 100-ml. portions of chloroform. The chloroform extracts are combined, washed with water, then with saturated sodium chloride and finally dried over anhydrous magnesium sulfate. Removal of the chloroform yields 14.3 g. of a dark red oil which is diluted with a little butanone and chilled at −20°. The product partially crystallizes. After removal of seed crystals, the butanone is removed in vacuo, the residual oil redissolved in hot acetonitrile (charcoaled), and the solution chilled and seeded resulting in the crystallization of 10.2 g. of product, M.P. 100.5–102.5° Recrystallization from isopropyl acetate and from acetonitrile gave 7.3 g. (59%) of pure material, M.P. 103.5–104.5°.

EXAMPLE XXV

*7-chloro-4-(1-phenethyl-3-pyrrolidylmethylamino) quinoline*

Reaction of 14.7 g. (0.05 mole) of 7-chloro-4-phenoxyquinoline hydrochloride with 14.3 g. (0.07 mole) of 1-phenethyl-3-pyrrolidylmethylamine gives after recrystallizations from butanone and acetonitrile 9.5 g. or 52% of product, M.P. 127–129°.

INTERMEDIATES

*4-chloroquinazolines substituted in the 2, 5, 6 or 7 positions*

A. *2,4-dichloroquinazoline.*—A mixture of 20.0 g. (0.123 mole) of benzoylene urea, 260 ml. of phosphorous oxychloride and 38 g. (0.266 mole) of tri-n-propylamine are refluxed (atmosphere excluded) for one hour, at the end of which time an additional 3 g. of tri-n-propylamine is added to the reaction solution. After refluxing an additional five minutes the phosphorous oxychloride is removed by distillation at reduced pressure. The crude product is extracted from the residue (mostly solidified) with four 200-ml. portions of hot n-heptane containing 2% tri-n-propylamine. The combined extracts, at room temperature, are diluted with enough benzene to dissolve crystallized solid. The organic solution is washed with 400 ml. of 5% sodium hydroxide and three times with water. The solvent is removed in vacuo, and the residual solid recrystallized from 2:1 ethylacetate-n-heptane to give 12.5 g. of 2,4-dichloroquinazoline as white needles, M.P. 117–118.2°. A second crop of product, weight 7.1 g., M.P. 116–117.5° C., is obtained by reducing the mother liquor to one-fourth the volume. The combined yield of the two crops is 19.6 g. (80%).

B. *4-chloro-6-bromo-quinazoline.*—This compound is prepared by reaction of phosphorous oxychloride with 6-bromo-4-quinazolone. The latter is prepared by the procedure of Baker et al., J. Org. Chem., 17, 141 (1952). The intermediate 5-bromoanthranilic acid is prepared by the direct bromination of anthranilic acid (Wheeler et al., J. Amer. Chem. Soc., 32, 770 (1910)), in 68% yield, M.P. 210–213° C. The 4-chloro-5-bromoquinazoline produces in 33% yield after recrystallization from isopropylether-cyclohexane melting at 160–163° C.

C. *4,5-dichloroquinazoline.*—This compound, M.P. 131.5–133° after recrystallization from heptane, is prepared by reaction of 5-chloro-4-quinazolone with phosphorous oxychloride. The 5-chloro-4-quinazolone is prepared by the procedure of Baker et al., ap. cit. The intermediate 6-chloroanthranilic acid, M.P. 234–235°, is prepared by the alkaline peroxide treatment of 4-chloroisatin. The 4-chloroisatin is prepared by ring closure of m-chloro-isonitrosoacetanilide. The 6-chloroisatin is also formed in this reaction.

*4-chloroisatin and 6-chloroisatin.*—m-Chloroaniline is converted by the procedure of Sandmeyer, Helv. Chim. Acta, 2, 234 (1919), to a crude mixture of 4-chloroisatin and 6-chloroisatin, essentially as reported by Senear, et al., J. Am. Chem. Soc. 68, 2695 (1946). To an alkaline solution of 129 g. of the crude mixture (using 1600 ml. of water and 300 ml. of 3 N sodium hydroxide) is added 35 ml. of 6 N hydrochloric acid. After stirring for thirty minutes the mixture is filtered to remove impurities. The filtrate is then acidified with 50 ml. of acetic acid, cooled overnight in the refrigerator, and filtered by suction to yield a first crop, weight 58.6 g., M.P. 244–255°. After standing for one week at room temperature, the filtrate yields a second crop, weight 8.3 g., M.P. 252–256°. Acidification of the mother liquor with 350 ml. of concentrated hydrochloric acid yields a third crop, weight 41.6 g., M.P. 257.5–259°. The first crop is 4-chloroisatin (34.3%, based on m-chloroaniline), while mixture melting points indicate crops 2 and 3 to be 6-chloroisatin (49.9 g., 40.3%).

When the separation is completed, as reported (Senear ibid.) with hydrochloric acid, there is obtained a 45% yield of crude 4-chloroisatin, and a 33% yield of crude 6-chloroisatin. Recrystallization of crude 4-chloroisatin from acetonitrile yields crystals melting at 256–257.5°.

*6-chloroanthranilic acid.*—To a solution of 59.4 g. (0.33 mole) of 4-chloroisatin in 550 ml. of 1.5 N sodium hydroxide is added 90 ml. of 30% hydrogen peroxide over fifteen minutes. After standing for two hours the solution is acidified with 570 ml. of concentrated hydrochloric acid, warmed to 60–70° and filtered through diatomaceous earth (Celite). To the filtrate is added an additional 500 ml. of concentrated hydrochloric acid. The solution is cooled and the solid filtered by suction and thoroughly washed with ether to yield 6-chloroanthranilic acid hydrochloride, M.P. 191–192° (dec.). Lit.: Guha et al., Chem. Abs. 51, 17170 (1957), M.P. 195°. The pH of a solution of the crude hydrochloride in 600 ml. of water is adjusted to 2.2 (from 0.6) with solid potassium carbonate, and the precipitated 6-chloroanthranilic acid is collected by suction filtration, weight 28.1 g. (50%), M.P. 140–141.5° (dec.). Recrystallization from a mixture of benzene and isopropylacetate yields light tan crystals, M.P. 144–145° (dec.).

D. *4,7-dichloroquinazoline.*—This compound is prepared by the condensation of 4-chloroanthranilic acid and formamide by the method of Baker et al., op. cit., followed by chlorination with phosphorous oxychloride as in "A" above. The 4,7-dichloroquinazoline has a melting point of 131–134° after recrystallization from heptane. The 4-chloroanthranilic acid, M.P. 234–235° C., is prepared in accord with the procedure for the preparation of 6-chloroanthranilic acid.

E. *4-chloro-6-methylquinazoline.*—The preparation of this compound is reported by Gabriel, Ber. 38, 3559 (1905).

EXAMPLE XXVI

*4-(1-methyl-3-pyrrolidylmethylamino)-7-chloroquinazoline*

To a solution of 8.0 g. (0.04 mole) of 4,7-dichloroquinazoline in 120 ml. of benzene was added a solution of 11.4 g. (0.1 mole) of 1-methyl-3-pyrrolidylmethylamine in 30 ml. of benzene. The mixture instantly becomes turbid but is allowed to stand at room temperature for four days, after which time the solvent is removed in vacuo to leave a yellow oil. This oil is mixed well with excess 5% sodium hydroxide and extracted with chloroform several times. The chloroform extracts are washed with water and dried over magnesium sulfate. Removal of the chloroform in vacuo leaves an oil (11.7 g.) which is recrystallized from acetonitrile to yield 7.4 g. of crude product, M.P. 80–100° C. Two further recrystallizations (acetonitrile, then isopropyl acetate) yield analytically pure material (see Table I), weight 3.6 g. (32%), M.P. 112–115°.

EXAMPLES XXVII–XXIX

These compounds are prepared in accordance with the procedure of Example XXVI. They have the following properties:

EXAMPLE XXVII

4 - (1 - methyl - 3 - pyrrolidylmethylamino) - 5 - chloroquinazoline, M.P. 63–64° C., after recrystallization from benzene. Yield 45%.

EXAMPLE XXVIII

4 - (1 - methyl - 3 - pyrrolidylmethylamino) - 6 - methylquinazoline, M.P. 116–117° C. after recrystallization from benzene-ethyl-ether. Yield 50%.

EXAMPLE XXIX

4 - (1 - methyl - 3 - pyrrolidylmethylamino) - 6 - bromoquinazoline, M.P. 122–126° C. after recrystallization from cyclohexane. Yield 40%.

EXAMPLE XXX

*2-chloro-4-(1-ethyl-3-pyrrolidylmethylamino) quinazoline dihydrate*

To a solution of 12.93 g. (0.065 mol) of 2,4-dichloroquinazoline in 200 ml. of benzene is added over a two minute period a solution of 17.31 g. (0.135 mole) of 1-ethyl-3-pyrrolidylmethylamine in 25 ml. of benzene. The internal temperature is kept below 30° by the use of an ice bath for external cooling; an oil quickly separates from solution. After standing at room temperature for one hour the reaction mixture is diluted with 100 ml. of ethyl acetate, and washed six times with water. The organic solution is dried over magnesium sulfate, and the solvent removed in vacuo to provide a viscous yellow oil which is recrystallized from aqueous acetonitrile to yield 16.5 g. (77.8%) of 2-chloro-4-(1-ethyl-3-pyrrolidylmethylamino)quinazoline dihydrate, M.P. 90–96°. The crystalline product is recrystallized once more from aqueous acetonitrile and then twice from ethyl acetate without affecting the melting point appreciably. The melting range is dependent upon the rate at which the sample is heated. When taken swiftly, the hydrate melts at 93–97°. When stored under vacuum at room temperature the water of hydration is lost to give a gum. However, when crushed well, the dihydrate dries nicely at atmospheric pressure to give analytically pure crystalline material. In ethanol, ultraviolet maxima are exhibited by the compound at 332, 318, 306, 289 and 238 m$\mu$ ($\epsilon$=8,260, 10,630, 8,260, 10,250 and 14,660). In ethanolic hydrochloric acid maxima are observed at 332, 318, 306 (shoulder), 288 and 226 m$\mu$ ($\epsilon$=13,250, 15,020, 10,320, 6,900 and 23,850).

EXAMPLE XXXI

*4-(1-methyl-3-pyrrolidylmethylamino)-2-chloroquinazoline dihydrate*

This compound when prepared by the method of Example XXX has a melting point of 91–96° C. after successive recrystallizations from aqueous acetonitrile and ethyl acetate. Yield 64%.

EXAMPLE XXXII

*4-(1-isopropyl-3-pyrrolidylmethylamino)-2-chloroquinazoline*

This compound, when prepared in accordance with the method of Example XXX, has a melting point of 122–123° C. when recrystallized from acrylonitrile and isopropylether. Yield 67%.

EXAMPLE XXXIII

*4-(1-β-phenethyl-3-pyrrolidylmethylamino)-2-chloroquinazoline*

This compound when prepared in accordance with the procedure of Example XXX has a melting point of 129–131° C. after recrystallization from acrylonitrile and 1:1 acetonitrile-isopropylether. Yield 44%.

EXAMPLE XXXIV

*2-mercapto-4-(1-methyl-3-pyrrolidylmethylamino) quinazoline*

A mixture of 6.5 g. (0.0335 mole) of 2,4-dimercaptoquinazoline, Elion et al., J.A.C.S. 69, 2138 (1947), and 3.82 g. (0.0335 mole) of 1-methyl-3-pyrrolidylmethylamine in 50 ml. of n-butanol is stirred under reflux (nitrogen) for six hours and then allowed to stand overnight. The solution is concentrated in vacuo to a resin which is dissolved in 350 ml. of hot isopropanol. The solution is treated with charcoal and concentrated to 150 ml. when a solid separates. The mixture is chilled to furnish 4.6 g. of product, M.P. 228–230°. The mother liquor is concentrated to furnish 2.5 g. of a second crop, M.P. 226°. The crops are combined and recrystallized twice by the addition of isopropyl acetate to a concentrated solution in methanol to furnish 6.5 g., 71%, M.P. 223–225° (dec.). In 0.1 N sodium hydroxide the compound exhibits ultraviolet absorption maxima at 340, 284 and 247 millimicrons ($\epsilon$=5,000, 27,400 and 21,400). In 0.1 N hydrochloric acid maxima are exhibited at 340, 291, 264 and 246 millimicrons ($\epsilon$=5,000, 32,400, 23,000 and 19,150).

EXAMPLE XXXV

*2-mercapto-4-(1-ethyl-3-pyrrolidylmethylamino) quinazoline*

The reaction of 7.8 g. (0.04 mole) of 2,4-dimercaptoquinazoline, Elion et al., J.A.C.S. 69, 2138 (1947), with 5.13 g. (0.04 mole) of 1-ethyl-3-pyrrolidylmethylamine, as described above, yields after recrystallization of the product from methanolic butanone 6.2 g. (54%) of material, M.P. 214–216° (dec.).

*2-mercapto-4-quinazolone*

A solution 54.8 g. (0.4 mole) of anthranilic acid, 48.5 (0.5 mole) of potassium thiocyanate and 55 ml. of concentrated hydrochloric acid in 400 ml. of distilled water is stirred under reflux for nine hours. The mixture is chilled and the solid collected. After drying, the product is suspended in 300 ml. of dimethylformamide and a little insoluble sludge removed by filtration. The liquor is diluted with 200 ml. of acetone, treated with activated charcoal and then diluted with 2 liters of water. The mixture is chilled and the solid collected to furnish 31.5 g., (44.5%) M.P. 295–300° (dec.). Lit.: Rupe, Ber., 30, 1098 (1897), M.P. 280–281°, by the reaction of potassium thiocyanate with ethyl anthranilate in ethanolic hydrogen chloride.

EXAMPLE XXXVI

*4-(1-ethyl-3-pyrrolidylmethylamino)quinazoline*

Equimolar amounts of 4-mercaptoquinazoline and 1-ethyl-3-pyrrolidylmethylamine are refluxed (under nitrogen) in n-butyl alcohol until the evolution of hydrogen sulfide ceases. Unreacted 4-mercaptoquinazoline is removed by suction filtration, and the solvent removed in vacuo. The residue is taken up in ethyl acetate, and the resulting solution washed with sodium hydroxide solution and water and then dried over anhydrous magnesium sulfate. The solvent is removed in vacuo and the oily product recrystallized three times from acetonitrile to result in a 27% yield of a product melting at 79–81° C.

EXAMPLE XXXVII

*4-(1-β-phenethyl-3-pyrrolidylmethylamino)quinazoline*

According to the general procedure of Example I–A, 4-chloroquinazoline and 1-β-phenethyl-3-pyrrolidylmethylamine, in benzene, react to give a 59% yield of pure 4 - (1 - phenethyl-3-pyrrolidylmethylamino)quinazoline (from acetonitrile twice), M.P. 107–108.5°. Unreacted 1-phenethyl-3-pyrrolidylmethylamine is removed from the crude product by vacuum distillation.

EXAMPLE XXXVIII

*4-[(1-methyl-3-pyrrolidylmethyl)methylamino]-6-bromoquinazoline*

A solution containing 8.3 g. (0.034 mole) of 4-chloro-6-bromoquinazoline, and 8.75 g. (0.068 mole) of (1-methyl-3-pyrrolidylmethyl)methylamine in 250 ml. of benzene is prepared and kept for two days at room temperature in a stoppered flask. A crystalline solid separates during this period. The benzene solution, without removal of the precipitate, is washed first with 20% aqueous sodium hydroxide, then with three 50 ml. portions of water, and finally with two 50 ml. portions of saturated aqueous sodium chloride, and dried over anhydrous magnesium sulfate. The benzene is removed by vacuum distillation, yielding 9.9 g. of a yellow oil which is taken up in methanol and treated with ethanolic hydrogen chloride to provide the dihydrochloride salt of the product. The clear yellow solution is then distilled and the evaporated solvent replaced with isopropyl ether, maintaining constant volume during the process, until the solution becomes turbid. The turbid solution is then cooled, resulting in crystallization of 10.9 g. (78%) of the crude dihydrochloride salt of the desired product, m.p. 250–255° C., dec. This material is recrystallized three times from methanol:isopropyl ether yielding 8.0 g. (57%) of pure product, M.P. 251–252.5° C. dec.

EXAMPLE XXXIX

*4-(1-methyl-3-pyrrolidylmethylamino)quinazoline orthophosphoric acid salt*

Purified 4-(1-methyl-3-pyrrolidylmethylamino)quinazoline, M.P. 110.5–112° C., 6.54 g. (0.027 mole), dissolved in 300 ml. of ethanol containing 29 ml. of water is treated with 26.0 ml. of 2.1 N phosphoric acid. The solution is stirred and the side of the vessel scratched to induce crystallization. It is then chilled overnight in the refrigerator and the product 11.0 g. (96%), is collected by filtration and washed with 40 ml. of ethanol and dried to constant weight at room temperature, M.P. 140–144.5° C.

$\lambda_{max}^{H_2O}$ 328 (10,020), 313 (11,800), 278 (6,610), and 238 millimicrons (11,350)

Figures in parentheses are molar extinction coefficients.

INTERMEDIATE

*1-dimethylamino-4-carbomethoxy-3-pyrrolidinone*

A solution of 79.7 g. (0.5 mole) of dimethyl itaconate and 30.1 g. (0.5 mole) of 1,1-dimethylhydrazine in 500 ml. of n-propanol containing a few crystals of p-toluenesulfonic acid is refluxed for five days. The solvent then distilled at reduced pressure and the residual liquid distilled in vacuo, B.P. 94–106° C./0.05 mm., $n_D^{25}$ 1.7673, yield 66.2 g. (71%).

Corresponding 1-dialkylamino-4-carboalkoxy-2-pyrrolidinones are prepared by reaction of 1,1-diethylhydrazine, 1,1-di-n-propylhydrazine, and 1,1-di-n-butylhydrazine with an appropriate dialkyl itaconate, such as dimethyl itaconate or diethyl itaconate, in corresponding fashion.

*1-dimethylamino-4-carbamyl-2-pyrrolidinone*

In excess of one molar proportion of anhydrous ammonia is added to a solution of 15.8 g. (0.085 mole) of 1-dimethylamino-4-carbomethoxy-2-pyrrolidinone in 200 ml. of absolute methanol. The solution is kept for four days at room temperature in a stoppered flask. The solvent is then distilled in vacuo and the solid residue twice recrystallized from 95% ethanol and once from isopropanol, yielding 8.9 g. (61%) of pure product, M.P. 170.5–172° C.

When anhydrous methylamine is substituted for anhydrous ammonia in the procedure of the preceding paragraph, 1-dimethylamino-4-(N-methylcarbamyl)-2-pyrrolidinone is obtained. The homologous 1-dialkylamino-4-(N-methylcarbamyl)-2-pyrrolidinones are produced in corresponding fashion from appropriate 1-disubstituted amino-4-carboalkoxy-2-pyrrolidinones.

EXAMPLE XL

*1-dimethylamino-3-pyrrolidylmethylamine*

A suspension of 26 g. (0.15 mole) of 1-dimethylamino-4-carbamyl-2-pyrrolidinone in 200 ml. of tetrahydrofuran is added, in small portions, to a suspension of 11.6 g. (0.30 mole) of lithium aluminum hydride in 500 ml. of tetrahydrofuran. The mixture is refluxed for 3½ hr., and the insoluble complex then hydrolyzed by the dropwise addition of 16.5 ml. (0.91 mole) of water thereto. Insoluble material is then filtered and washed twice with 300 ml. portions of boiling absolute ethanol. The combined tetrahydrofuran and ethanol filtrates are then concentrated to yield a dark liquid which is twice distilled in vacuo, yield 8.2 g. (38%), B.P. 90°/10 mm., $n_D^{25}$ 1.4828.

Analogous lithium aluminum hydride reductions are used to produce (1-dimethylamino-3-pyrrolidylmethyl)-methylamine from 1-dimethylamino-4-(N-methylcarbamyl)-2-pyrrolidinone, and the higher 1-dialkylamino homologs of each are produced in similar fashion.

EXAMPLE XLI

*A. 4-(1-dimethylamino-3-pyrrolidylmethylamino)-6-bromoquinazoline*

A solution of 5.84 g. (0.041 mole) of 1-dimethylamino-3-pyrrolidylmethylamine and 5.0 g. (0.020 mole) of 4-chloro-6-bromoquinazoline in 175 ml. of benzene is prepared and kept at room temperature for three days in a stoppered flask. Byproduct 1-dimethylamino-3-pyrrolidylmethylamino hydrochloride precipitates during the course of this period and is removed by filtration. The filtrate is then concentrated at reduced pressure, removing additional solid which separates, to yield a yellow oil which is induced to crystallize on cooling in an ice bath by scratching. The material is then recrystallized from acetonitrile after decolorizing the recrystallization solution with charcoal. Two additional recrystallizations from acetonitrile yield analytically pure material, 2.9 g. (41%), M.P. 120.5–122° C.

*B. 4-(3-pyrrolidylmethylamino)quinazoline hydrobromide*

A solution of 7.0 g. (0.02 mole) of 4-(1-dimethylamino-3-pyrrolidylmethylamino)-6-bromoquinazoline in 150 ml. of absolute ethanol is reduced with hydrogen at a pressure of three atmospheres in the presence of three and one-half teaspoonsful of Raney nickel catalyst. The calculated amount of hydrogen is absorbed in 23 hrs. The catalyst is filtered and the filtrate concentrated at reduced pressure, resulting in the separation of an amorphous solid. The solid is dissolved in 50 ml. of absolute methanol and the solvent distilled while maintaining constant solution volume by the addition of isopropyl ether thereto until the solution becomes turbid. The turbid solution is then chilled at −20° C., resulting in precipitation of 3.0 g. (48%) of the desired product, M.P. 240–244° C. This crude product is recrystallized from 95% ethanol to yield analytically pure material, M.P. 250.5–252° C., dec.

This product, when dissolved in 0.1 N HCl, exhibits ultraviolet absorption maxima at 218 (14,450), 242 (11,100), 315 (14,150), and 328 millimicrons (14,100). When dissolved in 0.1 N sodium hydroxide, ultraviolet absorption maxima are exhibited at 237 (8,250), 288 (6,260), 303 (5,700), 315 (7,070), and 327 millimicrons (5,470). The figures in parentheses are the molar extinction coefficients.

EXAMPLE XLII

*4-(1-methyl-3-pyrrolidylmethylamino)quinazoline salicylate*

To a solution of 12.1 g. (0.05 mole) of 4-(1-methyl-3-pyrrolidylmethylamino)quinazoline in 75 ml. of hot acetonitrile there is added a warm solution of 6.9 g. (0.05 mole) of salicylic acid dissolved in 35 ml. of acetonitrile. The resulting solution is then heated to boiling, concentrated to 70 ml. at atmospheric pressure, and cooled to 0° C. The solid which separates is collected and air-dried furnishing 18 g. of crude product, M.P. 162–163°. It is recrystallized from 150 ml. of acetonitrile, yielding 16.5 g. (87%) of pure crystalline material, M.P. 164–165°.

This salt is unique in that it exhibits greater anti-inflammatory activity on a molar base than the free base form of 4-(1-methyl-3-pyrrolidylmethylamino)quinazoline in the formalin edema test in the rat.

EXAMPLE XLIII

*4-(1-methyl-3-pyrrolidylmethylamino)quinazoline benzoate*

To a hot solution of 7.26 g. (0.3 mole) of 4-(1-methyl-3-pyrrolidylmethylamino)quinazoline in 40 ml. of acetonitrile there is added a hot solution of 3.66 g. (0.3 mole) of benzoic acid in 30 ml. of acetonitrile. The solution is heated in an open vessel and concentrated to 50 ml. The concentrate is cooled to 0° C., resulting in precipitation of a white solid which is collected and air-dried to furnish 10.7 g. of product, M.P. 122.5–126.5° C. Recrystallization of this product from 60 ml. of acetonitrile furnishes 9.6 g. (88%) of purified product, M.P. 121–122.5° C.

EXAMPLE XLIV

*4-(1-methyl-3-pyrrolidylmethylamino)-2-hydroxyquinazoline*

A mixture of 4.4 g. (0.025 mole) of 4-methoxy-2-hydroxyquinazoline (K. W. Breukink and P. E. Verkade, Recueil, 79, 443 (1960)), and 2.85 g. of 1-methyl-3-pyrrolidylmethylamine in 40 ml. of n-butanol is stirred under reflux for 4¼ hrs. The solution is concentrated in vacuo to yield a resin-like residue which solidifies on boiling with isopropanol. The dense white crystals are collected and recrystallized by the addition of isopropyl acetate to a methanolic solution thereof to furnish 4.4 g. (68%) of purified product, M.P. 220–221°. The product is soluble in dilute alkali and in dilute acid.

EXAMPLE XLV

*4-(1-methyl-3-pyrrolidylmethylamino)-2-methoxyquinazoline*

To a solution of 1.4 g. (0.046 mole) of sodium in 50 ml. of anhydrous methanol there is added a solution of 12.6 g. (0.046 mole) of 4-(1-methyl-3-pyrrolidylmethylamino)-2-chloroquinazoline in 50 ml. of anhydrous methanol. The reaction mixture is refluxed for 4 hours and the solvent then distilled. The residue is suspended in benzene and freed of inorganic salts by filtration. The product desired is obtained by concentration of the benzene solution.

EXAMPLE XLVI

*1-dimethylamino-3-pyrrolidylmethanol*

A suspension of 27.9 g. (0.15 mole) of 1-dimethylamino-4-carbomethoxy-2-pyrrolidinone in 200 ml. of tetrahydrofuran is added in small portions to a suspension of 11.6 g. (0.30 mole) of lithium aluminum hydride in 500 ml. of tetrahydrofuran. The mixture is refluxed for 3½ hrs. and the insoluble complex then hydrolyzed by the drop-wise addition of 16.5 ml. (0.91 mole) of water. Insoluble material is then filtered and washed twice with 300 ml. portions of boiling absolute ethanol. The combined tetrahydrofuran and ethanol filtrates are then concentrated to yield a liquid which is twice distilled in vacuo to yield the desired product.

EXAMPLE XLVII

*6-methoxy-4-(1-pyrrolidylmethoxy)quinoline*

To a suspension of 2.8 g. of 51.5% sodium hydride emulsion (0.06 mole) in 60 ml. of dry toluene there is added in drop-wise fashion a solution of 8.7 g. (0.06 mole) of 1-dimethylamino-3-pyrrolidylmethanol in 40 ml. of dry toluene. After addition is complete, the mixture is refluxed for ½ hr. and then 9.65 g. (0.05 mole) of 6-methoxy-4-chloroquinoline is added in one lot. The mixture is then stirred at reflux for 48 hours, cooled, and precipitated sodium chloride separated. The product is then recovered from the clear toluene filtrate by extraction with three 60 ml. portions of 5 N hydrochloric acid. The acid extracts are combined, washed with ether and then adjusted to pH 10–11 with 20% aqueous sodium hydroxide, resulting in separation of the product as an oil. This is the free base form of the desired intermediate 1-dimethylamino-3-pyrrolidyl compound. It is recovered by extraction with ether and distillation of the solvent from the extracts. This product may, if desired, be converted to the crystalline hydrochloride salt by dissolving it in absolute ethanol and treating the ethanolic solution with anhydrous hydrogen chloride.

A solution of 0.02 mole of 6-methoxy-4-(1-dimethylamino-3-pyrrolidylmethoxy)quinoline (the ether extracted material above) in 75 ml. of absolute ethanol is reduced with hydrogen at a pressure of three atmospheres in the presence of 3½ teaspoonsful of Raney nickel catalyst. After absorption of 0.01 mole of hydrogen, the catalyst is filtered and the filtrate concentrated at reduced pressure to yield the desired product.

EXAMPLE XLVIII

*6-methyl-4-(3-pyrrolidylmethoxy)quinazoline*

The procedure of Example XLVII is repeated with the substitution of 6-methyl-4-chloroquinazoline for the 6-methoxy-4-chloroquinoline specified in the example and of an equimolar amount of lithium amide for the sodium hydride specified. The process conditions required for this transformation are substantially the same as those indicated in Example XLVII.

EXAMPLE XLIX

*4-(3-pyrrolidylmethylamino)-2-hydroxyquinazoline*

A mixture of 4.4 g. (0.025 mole) of 4-methoxy-2-hydroxyquinazoline and 3.58 g. of 1-dimethylamino-3-pyrrolidylmethylamine in 40 ml. of butanol is stirred under reflux for 4¼ hrs.

The solution is then cooled to room temperature, diluted with an equal volume of butanol and 4 teaspoonsful of Raney nickel catalyst are added thereto and the mixture hydrogenated with agitation at room temperature and at a pressure of approximately 45 p.s.i.g. After absorption of hydrogen ceases, the catalyst is filtered and the solvent removed from the filtrate by distillation at reduced pressure. The product is recovered as an amorphous residue.

EXAMPLE L

*4-(3-pyrrolidylmethylamino)-2-methoxyquinazoline*

To a solution of 12.93 g. (0.065 mole) of 2,4-dichloroquinazoline in 200 ml. of benzene there is added over a two minute period a solution of 19.3 g. (0.135 mole) of 1-dimethylamino-3-pyrrolidylmethylamine in 25 ml. of benzene. The benzene solution is then thoroughly washed with water and dried over anhydrous magnesium sulfate crystals. A solution of 1.5 g. of sodium in 60 ml. of anhydrous methanol is then carefully added to the dried benzene solution after separation of the drying agent therefrom. The mixture is then refluxed for 4 hrs., again thoroughly washed with water, dried, and the solvent distilled in vacuo.

The residue is then dissolved in 500 ml. of absolute ethanol, 11 teaspoonsful of Raney nickel catalyst added to the solution, and the suspension hydrogenated at a pressure of 60 p.s.i.g. of hydrogen until slightly in excess of 0.065 mole of hydrogen have been absorbed. The catalyst is separated by filtration and the filtrate treated with decolorizing carbon, the carbon separated, and the filtrate concentrated to dryness to yield the desired product.

EXAMPLE LI

*2-methyl-4-(3-pyrrolidylmethylamino)quinazoline*

2-methyl-4-mercaptoquinazoline, 0.143 mole, and two molecular proportions relative thereto of 1-dimethyl-amino-3-pyrrolidylmethylamine are placed in a 100 ml. round bottomed flask equipped with a reflux condenser and heated in an oil bath at 110–115° C. for a period sufficient to result in complete liquefaction of the mixture and until hydrogen sulfide evolution ceases. The mixture is then cooled, dissolved in chloroform, and the chloroform solution washed once with ice cold 10% sodium hydroxide solution to remove any unreacted 2-methyl-4-mercaptoquinazoline. The chloroform solution is separated, dried, and the solvent distilled in vacuo. The residue is then dissolved in 1 l. of absolute ethanol and hydrogenated at 45 p.s.i.g. over approximately 20 teaspoonsful of Raney nickel catalyst. When hydrogen absorption ceases, the catalyst is filtered, and the filtrate concentrated to dryness, taking particular care to remove all volatile constituents.

EXAMPLE LII

A. *7-chloro-4-(1-dimethylamino-3-pyrrolidylmethylamino)-quinoline*

A solution of 3.7 g. of hydrogen chloride in ethanol, 25 ml., is added to a solution of 19.6 g. (0.1 mole) of 1-di-n-propylamino-3-pyrrolidylmethylamine in 70 ml. of acetone. Phenol, 18.8 g. (0.2 mole) is added to the solution and the solvent removed in vacuo. An additional 7.6 g. (0.04 mole) of the above amine and 19.8 g. (0.1 mole) of 4,7-dichloroquinoline are then added. The flask containing the mixture, which is stirred, is heated at 125° C. for 10 hours and at 140° C. for an additional 2 hrs. After standing overnight at room temperature, the mixture is dissolved in 100 ml. of hot methanol and the solution diluted with water until turbid. It is then adjusted to pH 14 with 40% aqueous sodium hydroxide. The oil which separates is extracted into ether, the ether extracts washed with 5% aqueous sodium hydroxide, dried, and concentrated, leaving a residual oil which crystallizes on standing or treatment with solvents.

B. *4-(3-pyrrolidylmethylamino)quinoline hydrochloride*

A solution of 7.2 g. (0.02 mole) of 4-(1-di-n-propyl-amino-3-pyrrolidylmethylamino)-7-chloro quinoline in 150 ml. of absolute ethanol is agitated with hydrogen at a pressure of 3 atmospheres in the presence of 3½ teaspoonsful of Raney nickel catalyst. After absorption of the calculated amount of hydrogen (for removal of chloro and di-n-propylamino groups), the catalyst is filtered, and the filtrate concentrated at reduced pressure, leaving an amorphous solid as residue. The residue is dissolved in 50 ml. of absolute methanol and the solvent distilled while maintaining constant solution volume by the addition of isopropyl ether thereto until the solution becomes turbid. The desired product crystallizes on cooling and is collected.

While the foregoing examples illustrate the preparation of certain acid addition salts, it should be understood that other acid addition salts of the several compounds may be readily prepared by conventional methods. Exemplary of useful nontoxic and pharmacologically acceptable acid addition salts are the hydrobromides, hydroiodides, sulfates, phosphates, maleates, acetates, citrates, succinates, salicylates, tartrates and the like.

Likewise it should be understood that with reference to the lower alkyl and lower alkenyl groups where indicated in the foregoing structural formulas, the most preferred are those wherein the group contains up to four carbon atoms.

As indicated, the compounds of the present invention may be prepared by several alternative methods. One preferred process is by the reaction of a compound of the formula

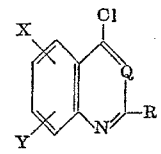

Compound XIX with a 1-substituted-3-pyrrolidylmethylamine of the formula

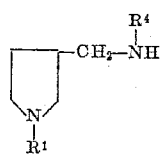

wherein the groups X, Y, Q, $R^1$, $R^2$ and $R^4$ are as defined above to produce 4-(1-substituted-3-pyrrolidylmethylamino)quinazolines and quinolines of the formula

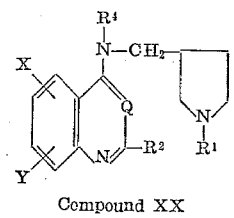

Compound XX

In a similar manner 4-(1-substituted-3-pyrrolidylmethoxy)quinazolines and quinolines may be prepared by the reaction of Compound XIX with an alkali metal alkoxide of the formula

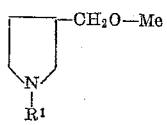

wherein Me is an alkali metal preferably selected from the group consisting of sodium, potassium and lithium. The reaction is preferably carried out under anhydrous conditions in an inert solvent.

The appended table contains analytical data for some of the compounds prepared as described herein. These measurements were made by standard microanalytical techniques and agree within the range of precision of the analytical methods used with the compositions calculated for the various compounds as named.

TABLE III.—ANALYSES

| Compound Name | Example number | Carbon (percent by weight) | Hydrogen (percent by weight) | Nitrogen (percent by weight) | Chlorine (percent by weight) |
|---|---|---|---|---|---|
| 4-(1-methyl-3-pyrrolidylmethyl-amino)quinazoline | I | 69.69 | 7.80 | 23.30 | |
| 4-(1-benzyl-3-pyrrolidylmethyl-amino)quinazoline | II | 75.89 | 6.89 | 17.67 | |
| 4-(1-β-hydroxyethyl-3-pyrrolidyl-methylamino)quinazoline | III | 66.34 | 7.60 | 20.39 | |
| 4-(1-methyl-3-pyrrolidylmethyl-amino)-6-chloroquinazoline | IV | 61.06 | 6.01 | 20.02 | 12.63 |
| 2-methyl-4-(1-methyl-3-pyrrolidyl-methylamino)quinazoline | V | 70.25 | 8.09 | 21.98 | |
| 2-methyl-4-(1-methyl-3-pyrrolidyl-methylamino)-6-chloroquinazoline | VI | 62.15 | 6.52 | 19.45 | |
| 4-[(-methyl-3-pyrrolidylmethyl)methylamino]quinazoline | VII | 70.02 | 8.05 | 21.70 | |

TABLE III.—ANALYSES—Continued

| Compound Name | Example number | Carbon (percent by weight) | Hydrogen (percent by weight) | Nitrogen (percent by weight) | Chlorine (percent by weight) |
|---|---|---|---|---|---|
| 4-(1-methyl-3-pyrrolidylmethoxy) quinazoline hydrochloride | VIII | 60.08 | 6.46 | | 12.52 |
| 4-(1-isopropyl-3-pyrrolidylmethoxy) quinazoline hydrochloride | IX | 62.43 | 7.48 | 13.65 | 11.42 |
| 4-(1-phenethyl-3-pyrrolidylmethoxy) quinazoline hydrochloride | X | | | 11.24 | 9.45 |
| 4-[(1-methyl-3-pyrrolidylmethyl) methylamino]-7-chloroquinoline dihydrochloride | XI | 52.44 | 6.07 | | 28.83 |
| 7-chloro-4-(1-methyl-3-pyrrolidylmethoxy)quinoline | XII | 65.27 | 6.48 | 10.17 | |
| 4-(1-isopropyl-3-pyrrolidylmethoxy)-7-chloroquinoline dihydrochloride | XIII | 54.32 | 6.24 | | |
| 4-[1-(2-phenylethyl)-3-pyrrolidylmethoxy]-7-chloroquinoline dihydrochloride | XIV | 71.74 | 6.89 | 7.65 | |
| 7-chloro-4-(1-methyl-3-pyrrolidylmethylamino)quinoline | XV | 65.44 | 6.69 | 15.47 | |
| 7-chloro-4-(1-ethyl-3-pyrrolidylmethylamino)quinoline | XVI | 66.14 | 7.19 | 14.23 | |
| 7-chloro-4-(1-allyl-3-pyrrolidylmethylamino)quinoline | XVII | 67.65 | 6.59 | 14.09 | |
| 7-chloro-4-(1-n-butyl-3-pyrrolidylmethylamino)quinoline | XVIII | 67.83 | 7.21 | 12.99 | |
| 7-chloro-4-(1-benzyl-3-pyrrolidylmethylamino)quinoline | XIX | | | 11.87 | |
| 4-(1-methyl-3-pyrrolidylmethoxy) quinoline dihydrochloride | XX | 57.40 | 5.94 | | 22.32 |
| 6-methoxy-4-(1-methyl-3-pyrrolidylmethylamino)quinoline | XXI | 71.09 | 8.07 | 15.58 | |
| 6-methoxy-4-(1-ethyl-3-pyrrolidylmethylamino)quinoline | XXII | 71.48 | 7.89 | 14.40 | |
| 6-methoxy-4-(1-methyl-3-pyrrolidylmethoxy)quinoline dihydrochloride | XXIII | 55.68 | 6.67 | | |
| 7-chloro-3-methyl-4-(1-methyl-3-pyrrolidylmethylamino) quinoline | XXIV | 66.09 | 7.27 | 14.38 | |
| 7-chloro-4-(1-phenethyl-3-pyrrolidylmethylamino)quinoline | XXV | 72.36 | 6.69 | 11.29 | |
| 4-(1-methyl-3-pyrrolidylmethylamino)-7-chloroquinazoline | XXVI | 60.84 | 6.17 | 20.30 | 12.71 |
| 4-(1-methyl-3-pyrrolidylmethylamino)-5-chloroquinazoline | XXVII | 60.87 | 6.28 | 19.96 | 12.96 |
| 4-(1-methyl-3-pyrrolidylmethylamino)-6-methylquinazoline | XXVIII | 70.13 | 7.62 | 21.65 | |
| 4-(1-methyl-3-pyrrolidylmethylamino)-6-bromoquinazoline | XXIX | 52.23 | 5.36 | 17.25 | [1] 24.99 |
| 2-chloro-4-(1-ethyl-3-pyrrolidylmethylamino)quinazoline dihydrate | XXX | 55.33 | 6.78 | 17.30 | 10.76 |
| 4-(1-methyl-3-pyrrolidylmethylamino)-2-chloroquinazoline dihydrate | XXXI | 53.94 | 6.78 | 18.09 | 11.30 |
| 4-(1-isopropyl-3-pyrrolidylmethylamino)-2-chloroquinazoline | XXXII | | | 18.27 | 11.42 |
| 4-(1-β-phenethyl-3-pyrrolidylmethylamino)-2-chloroquinazoline | XXXIII | 69.04 | 6.24 | 15.16 | 9.47 |
| 2-mercapto-4-(1-methyl-3-pyrrolidylmethylamino) quinazoline | XXXIV | 61.51 | 6.78 | 20.19 | [2] 11.40 |
| 2-mercapto-4-(1-ethyl-3-pyrrolidylmethylamino)quinazoline | XXXV | 61.93 | 6.89 | 19.24 | |
| 4-(1-ethyl-3-pyrrolidylmethylamino)quinazoline | XXXVI | 70.14 | 7.52 | 22.31 | |
| 4-(1-β-phenethyl-3-pyrrolidylmethylamino)quinazole | XXXVII | 75.89 | 6.89 | 17.67 | |
| 4-[(1-methyl-3-pyrrolidylmethyl) methylamino]-6-bromoquinazoline | XXXVIII | 43.77 | 5.10 | 13.67 | kk |
| 4-(1-methyl-3 pyrrolidyl-methylamino)quinazoline orthophosphoric acid salt | XXXIX | 36.77 | 5.73 | 12.27 | |
| 1-dimethylamino-3-pyrrolidylmethylamine | XL | 58.77 | 11.84 | 29.38 | |
| 4-(1-dimethylamino-3-pyrrolidylmethylamino)-6-bromoquinazoline | XLI-A | 51.51 | 5.49 | 20.04 | |
| 4-(3-pyrrolidylmethylamino) quinazoline hydrobromide | XLI-B | 50.37 | 5.87 | 18.04 | |
| 4-(1-methyl-3-pyrrolidylmethylamino)quinazoline salicylate | XLII | 66.46 | 6.38 | 14.62 | |
| 4-(1-methyl-3-pyrrolidylmethylamino)quinazoline benzoate | XLIII | 69.39 | 6.47 | 15.52 | |
| 4-(1-methyl-3-pyrrolidylmethylamino)-2-hydroxyquinazoline | XLIV | 65.08 | 6.93 | 21.82 | |

[1] Percent by weight bromine.   [2] Percent by weight sulfur.

While several particular embodiments of this invention are suggested above, it will be understood of course that the invention is not to be limited thereto since many modifications may be made and it is contemplated therefore by the appended claims to cover any such modifications as fall within the true spirit and scope of this invention.

What is claimed is:
1. A compound selected from the group consisting of

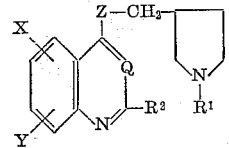

and

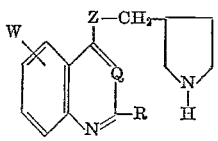

wherein W is selected from the group consisting of hydrogen, methyl, and lower alkoxy; X is selected from the group consisting of hydrogen, halogen, methyl, and lower alkoxy; Y is selected from the group consisting of hydrogen and halogen; Z is selected from the group consisting of oxygen, imino, and methylimino; Q is nitrogen; $R^1$ is selected from the group consisting of lower alkyl, phenyl lower alkyl, lower alkylene, and hydroxy lower alkyl; $R^2$ is selected from the group consisting of hydrogen, hydroxy, methoxy, chlorine, methyl, and mercapto; R is selected from the group consisting of hydrogen, hydroxy, methoxy, and methyl; and the pharmacologically acceptable acid addition salts of said compounds.

2. 4-(3-pyrrolidylmethylamino)quinazoline.

3. 4 - [(1 - methyl-3-pyrrolidylmethyl)methylamino]-6-bromoquinazoline.

4. 6-methyl-4-(3-pyrrolidylmethoxy)quinazoline.

5. 4 - (1-methyl-3-pyrrolidylmethylamino)quinazoline.

6. 4 - (1 - methyl-3-pyrrolidylmethylamino)-6-chloroquinazoline.

7. 4 - (1 - methyl-3-pyrrolidylmethylamino)-2-methylquinazoline.

8. 4 - [(1 - methyl-3-pyrrolidylmethyl)methylamino] quinazoline.

9. 2 - mercapto-4-(1-methyl-3-pyrrolidylmethylamino) quinazoline.

10. 4 - (1-methyl-3-pyrrolidylmethylamino)-6-bromoquinazoline.

References Cited by the Examiner

UNITED STATES PATENTS

| | | | |
|---|---|---|---|
| 2,526,417 | 10/50 | Reitsema | 260—288 |
| 2,826,588 | 3/58 | Feldkamp et al. | 260—313 |
| 2,951,078 | 8/60 | Biel | 260—313 |

FOREIGN PATENTS

| | | |
|---|---|---|
| 681,358 | 10/52 | Great Britain. |

OTHER REFERENCES

Elderfield: Heterocyclic Compounds, volume 6 (New York, 1957), pages 268–271, 360–361.

Reitsema: Jour. Am. Chem. Soc., vol. 71, pp. 2041–3, (1949).

IRVING MARCUS, *Primary Examiner.*

D. T. McCUTCHEN, *Examiner.*

UNITED STATES PATENT OFFICE
CERTIFICATE OF CORRECTION

Patent No. 3,184,462                                          May 18, 1965

Homer C. Scarborough et al.

It is hereby certified that error appears in the above numbered patent requiring correction and that the said Letters Patent should read as corrected below.

Column 2, lines 25 to 30, Compound IV, the upper left-hand portion of the formula reading

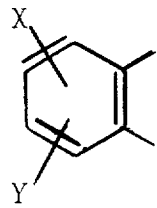  read  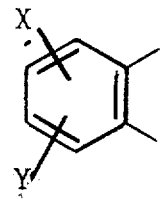

column 8, line 12, for "micros" read -- microns --; column 10, line 41, for "1-(2-phenylethyl-3-" read -- 1-(2-phenylethyl)-3- --; line 42, strike out "is prepared"; line 56, after "hours" insert -- and --; same column 10, line 71, for "EXAMPLE" read -- EXAMPLES --; column 11, line 36, for "-nethyl-", in italics, read -- -methyl- --, in italics; column 13, line 58, for "ap." read -- op. --; column 17, line 38, for "INTERMEDIATE" read -- INTERMEDIATES --; line 41, for "79.7" read -- 79.1 --; column 18, line 26, for "pyrrolidylmethylamino" read -- pyrrolidylmethylamine --; column 19, line 64, for "(1-pyrrolidylmethoxy)", in italics, read -- (3-pyrrolidylmethoxy) --, in italics; column 20, line 73, for "1-dimethyl-ami-" read -- 1-dimethylami- --; column 21, line 17, for "amino)-quinoline", in italics, read -- amino)quinoline --, in italics; columns 21 and 22, Table III, Example VII, for "4-[(-methyl-" read -- 4-[(1-methyl- --; columns 23 and 24, Table III, Example XXXVII, for "quinazole" read -- quinazoline --.

Signed and sealed this 7th day of December 1965.

(SEAL)
Attest:

ERNEST W. SWIDER                                    EDWARD J. BRENNER
Attesting Officer                                     Commissioner of Patents